United States Patent [19]

Klein

[11] 4,361,379
[45] Nov. 30, 1982

[54] SURGERY MICROSCOPE WITH CUT-THROUGH FORM LENS WITH A LIGHT BARRIER

[75] Inventor: Friedrich Klein, Wedel, Fed. Rep. of Germany

[73] Assignee: Firma J. D. Möller Optische Werke GmbH, Wedel, Fed. Rep. of Germany

[21] Appl. No.: 175,450

[22] Filed: Aug. 5, 1980

[30] Foreign Application Priority Data

Aug. 10, 1979 [DE] Fed. Rep. of Germany ....... 2932486

[51] Int. Cl.³ ............................................. G02B 21/06
[52] U.S. Cl. ..................................................... 350/91
[58] Field of Search ................... 350/168, 19, 87, 186, 350/91

[56] References Cited

U.S. PATENT DOCUMENTS 3,176,583  4/1965  Klein ...................................... 350/91
3,741,621  6/1973  McCrobbie ............................ 350/38
3,790,249  2/1974  Treace .................................... 350/91
3,857,626  12/1974  Rosenberger et al. ............... 350/91
3,868,171  2/1975  Hoppl .................................... 350/91

FOREIGN PATENT DOCUMENTS 713853  8/1951  France ................................. 350/448

*Primary Examiner*—Jon W. Henry
*Attorney, Agent, or Firm*—Toren, McGeady & Stanger

[57] ABSTRACT

The invention relates to a surgery microscope with a front lens having at least one displaceable element through which the light beams can be passed in addition to the observation beams. The displaceable front lens element is constructed in cut-through form between the path of the illumination rays and the reflections on the lens surfaces on the one hand and the path of the observation rays on the other and has the cut point or notch of a light barrier. As a result, reflections which would otherwise occur on the individual lens component surfaces are kept away from the paths of the observation rays.

8 Claims, 10 Drawing Figures

SURGERY MICROSCOPE WITH CUT-THROUGH FORM LENS WITH A LIGHT BARRIER

BACKGROUND OF THE INVENTION

The invention relates to a surgery microscope with a front lens thereof having at least one displaceable element and through which light beams are passed in addition to observation beams.

In microsurgical operations, it is often necessary to focus the surgery microscope onto a higher or lower plane in the observation field. If the optical axis of the microscope was not parallel to one of the displacement or support axes of the microscope mounting or the operating table, although a displacement of the entire microscope or the patient along one of these axes would bring about a focusing, it would lead to a lateral drift of the observed object in the field of vision.

This disadvantage is already obviated in known surgery microscopes with continuously variable working distance. A surgery microscope is known with a displaceable front lens having a continuously variable working distance (DAS No. 1,220,630). In addition, a surgery microscope has been proposed with a two-element front lens with variable focal lengths (DOS No. 2,439,820).

If in a surgery microscope with displaceable front lens or with a variable lens focal distance, the path of the illumination rays is passed through the front lens alongside the path of the observation rays, there are numerous reflections on the individual surfaces of the lens components and they are displaced in a substantially uncontrollable manner on displacing the lens or its displaceable element. Even in the case of a top quality dereflection or blooming of the surfaces disturbing light source reflections still penetrate the adjacent path of the observation rays.

BRIEF SUMMARY OF THE INVENTION

The problem of the present invention is, in the case of a surgery microscope with a displaceable front lens or with a front lens having a variable focal length, to permit the passage of the illumination rays through the area of the front lens which cannot be used for observation, particularly in the case of stereoscopic microscopes, without light source reflections occurring in the path of the observation rays.

According to the invention, this problem is solved by a surgery microscope of the aforementioned type constructed in such a way that the displaceable element of the front lens is cut through between the path of the illumination rays and their reflections on the lens surfaces on the one hand and the path of the observation rays on the other and the cut point or notch is provided with a light barrier.

The light barrier can be constructed as a fixed or displaceable cover plate, by colouring black the unpolished sectional planes or by polishing the illumination-side sectional planes of the displaceable element of the front lens.

As a result of the inventive construction of a surgery lens with a displaceable front lens element provided with a light barrier, reflections which otherwise occur on the individual surfaces of the lens components are kept away from the path of the observation rays.

Further advantageous embodiments of the invention can be gathered from the subclaims.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
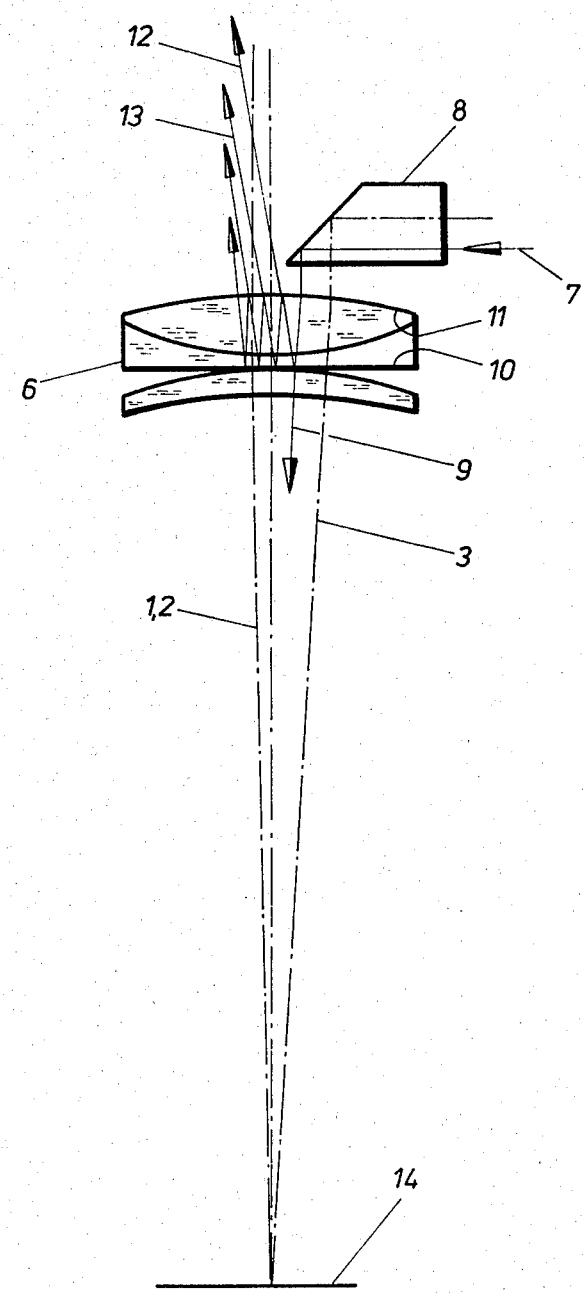
FIGS. 1, 1a and 1b the axes for the paths of the observation rays and the axis for the path of the illumination ray, as well as the passage surfaces of the observation and illumination rays through the front lens of a surgery microscope.
Figure 1A:
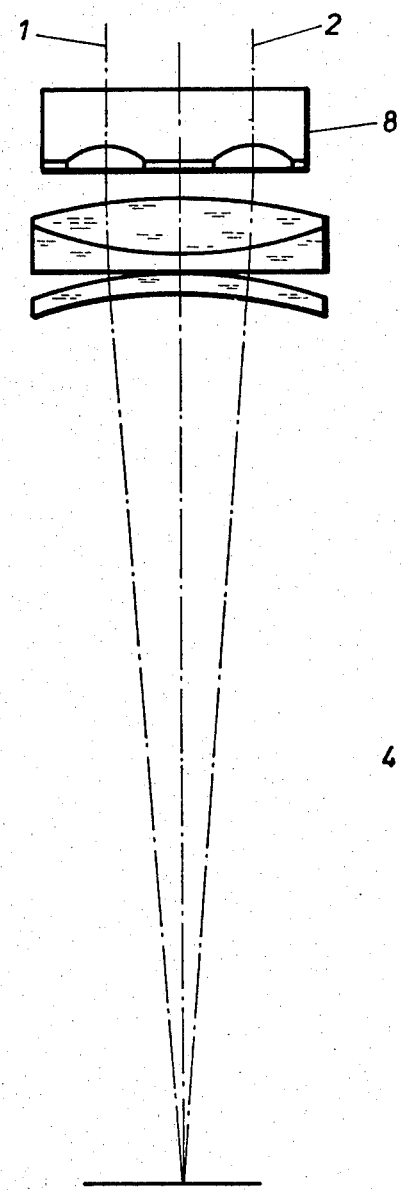
Figure 1B:
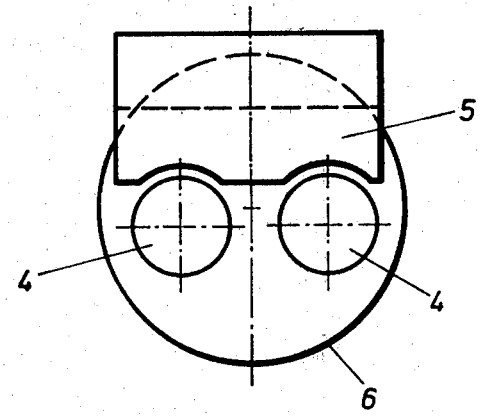

In order to illustrate the invention, FIGS. 1, 1a and 1b diagrammatically show the axes 1, 2 for the paths of the observation rays and axis 3 for the path of the illumination rays, as well as the passage surfaces of the observation and illumination rays 4, 5 through the front lens 6 of a surgery microscope. It is also possible, for example, to see the path of stray illumination rays entering the path of the observation rays. A randomly selected illumination ray 7 passes through a deviating prism 8 into the front lens 6 from which it is irradiated in direction 9 onto the observation plane 14. However, partial reflections occur on each of the lens surfaces, whereby they are illustrated by those meeting surfaces 10 and 11. After reflection once on surface 10, a first reflection beam 12 enters the area of the path of the observation beam, after reflection twice on surface 10 and reflection once on surface 11 there is a second reflection beam 13 and so on. Since, in addition to beam 7, all other parallel beams and beams directed counter to it supply similar reflection beams which are also imaged by the curved surfaces, reflections occur in the field of vision.

For as long as the front lens is not axially adjusted, it is possible by selecting suitable angles between the paths of the illumination and observation rays to prevent the penetration of reflections into the paths of the observation rays. However, if the front lens or an element thereof is displaceable, in order to vary its focal length, the path of the reflection beam becomes uncontrollable.

Various constructions of the surgery microscope according to the invention are shown in FIGS. 2 to 6 and are described hereinafter.

Figure 2:
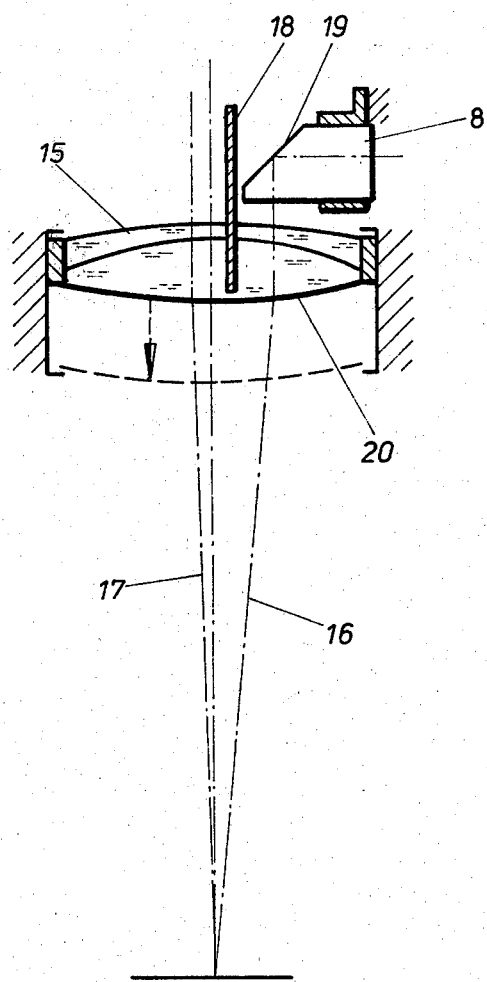
FIG. 2 a surgery microscope with a displaceable front lens having a notch parallel to the optical axis and with a light barrier arranged in the cutting gap.

In the embodiment of a surgery microscope shown in FIG. 2, 15 is a displaceable front lens cut between the paths of the illumination rays with optical axis 16 and that of the observation rays with optical axis 17 by means of a cut parallel or approximately parallel to the optical axis of the front lens. The thus formed cutting gap is filled with a cover plate 18 serving as a light barrier. The notch and the light barrier or cover plate 18 penetrate to such a depth into the lens 15 that the rays reflected by the specular surface 19 of deviating prism 8 and from lens surface 20 cannot penetrate the area of lens 15 which is penetrated by the path of the observation rays symbolized by optical axis 17. Lens 15 is very close to the deviating prism 8 in its upper end position. Thus, cover plate 18 must project by the same length out of the lens 15 as the latter is displaceable.

Figure 3A:
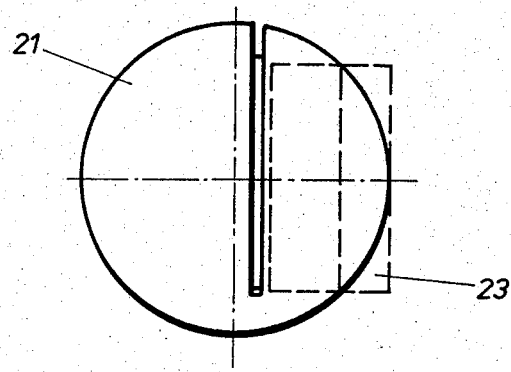
FIGS. 3 and 3a a surgery microscope with a displaceable front lens having a cover plate serving as a light barrier passing through all the refracting surfaces of the lens.
Figure 3:
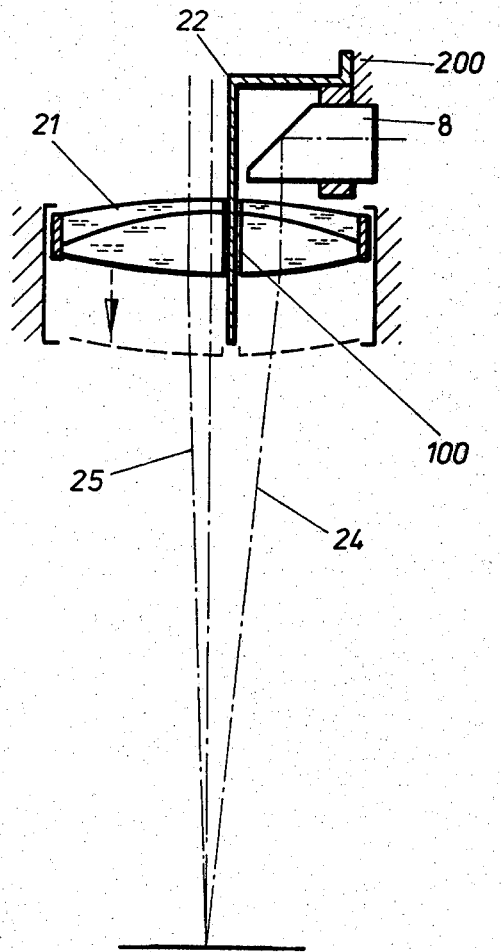

FIGS. 3 and 3a show two views of a displaceable front lens 21 of a surgery microscope with a notch 100 in lens 21 which is parallel to the optical axis. Notch 100 of lens 21 contains a cover plate 22 serving as a light barrier which separates the paths of the rays. However, in this embodiment, notch 100 is passed through all the refracting surfaces of lens 21, whilst cover plate 22 is fixed to the microscope casing 200. The light 24 deviated by prism 8 cannot penetrate by reflections on the side of the path of the observation rays 25.

Figure 4:
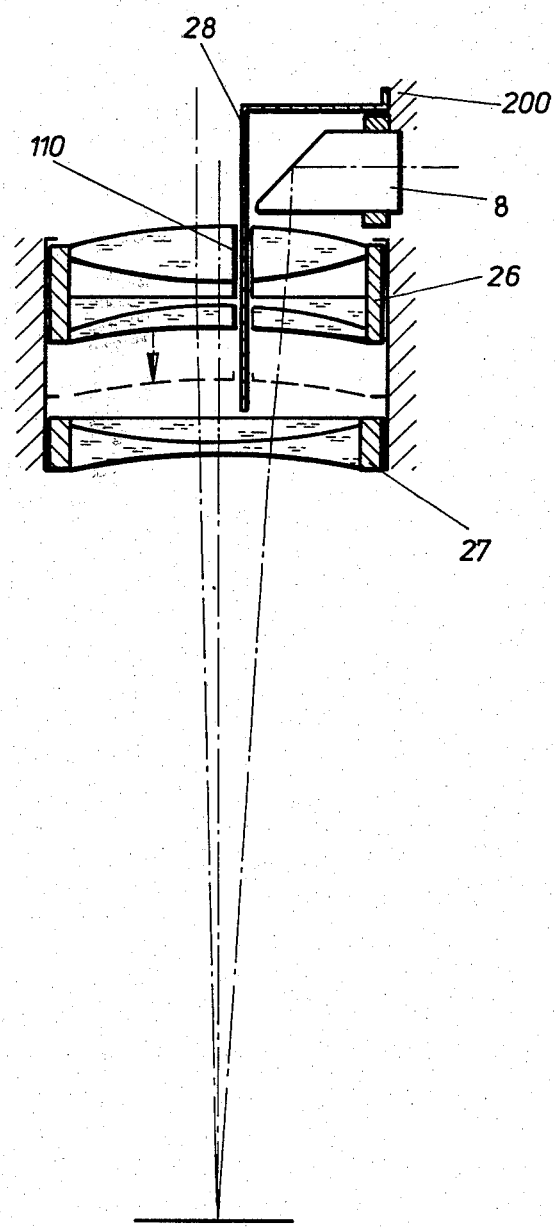
FIG. 4 a surgery microscope with a front lens having a movable element and a fixed element and with a cover plate serving as a light barrier passed through the movable element into the vicinity of the fixed element.

The surgery microscope shown in FIG. 4 has a front lens with a variable focal length comprising a movable collecting element 26 and a fixed dispersing element 27. The movable element 26 is separated by a paraxial cut 110. A cover plate 28 serving as a light barrier fixed to the microscope casing 200 via deviating prism 8 projects through the cutting gap 110. This cover plate 28 terminates just before the fixed element 27, so that no reflections can enter the space of the path of the observation rays.

Figure 5:
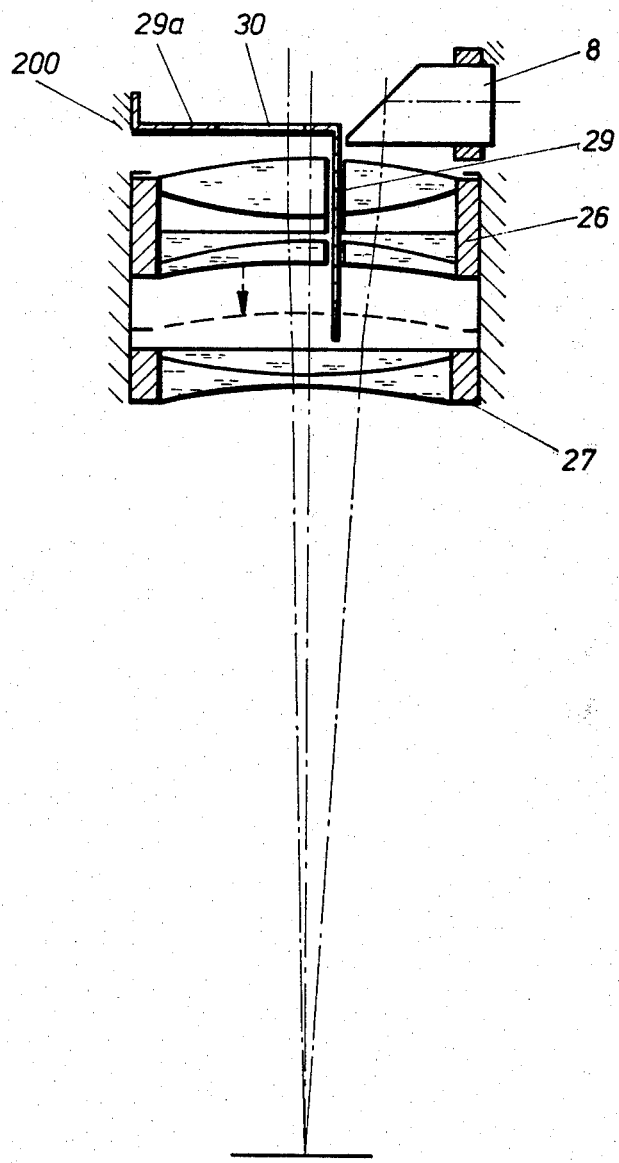
FIG. 5 a surgery microscope with a further construction of a cover plate serving as the light barrier fixed in the notch of the movable element of the front lens.

A further advantageous variant of this embodiment is shown in FIG. 5. In order to bring about a reduced overall height in this case the cover plate 29 is not bent via the deviating prism 8 and is instead bent on the side of the path of the observation rays and fixed to the microscope casing 200. The bent portion 29a of cover plate 29 is provided with at least one opening 30 for the passage of the path of the observation rays.

Figure 6:
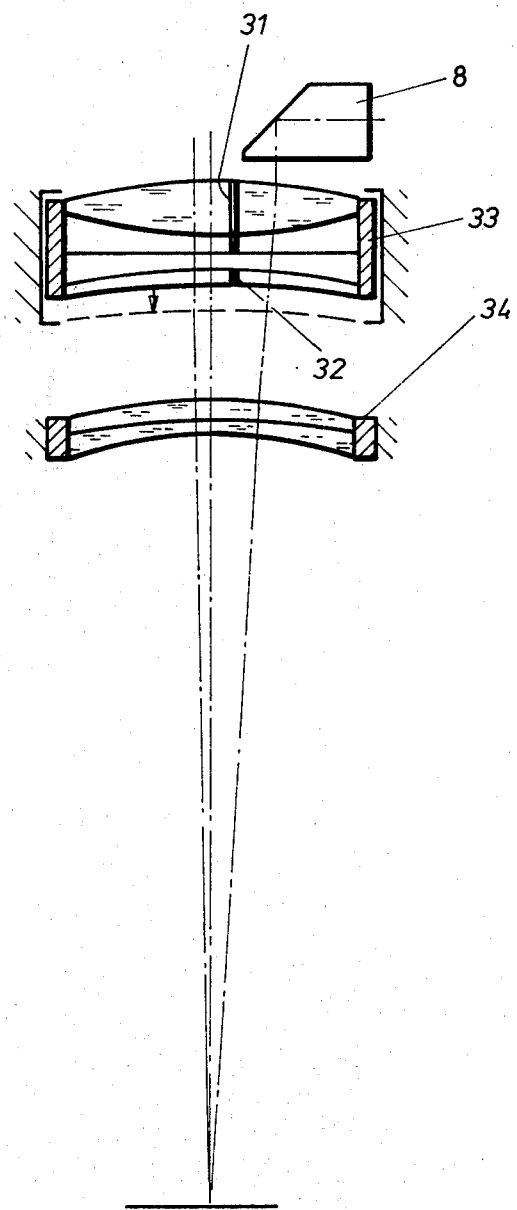
FIG. 6 a surgery microscope with black coloured sectional planes of the movable element of the front lens.

FIG. 6 provides an embodiment in which the light barrier is formed by colouring black the sectional planes or by filling the cutting gaps 31, 32 of the displaceable element 33 of the front lens with an opaque filler instead of using a cover plate. However, this embodiment only permits a limited displacement of the displaceable element 33 of the front lens. This solution is particularly suitable in conjunction with a fixed lens element 34 in which all the surfaces are bent in the direction of the object because, with adequate bending, such an element produces light reflexes which can penetrate the path of the observation rays.

The embodiment of FIG. 6 can also be modified in such a way that the light barrier is not formed by colouring black or by filling with an opaque filler and is instead formed by polishing the illumination-side sectional planes. The illumination-like beams cannot pass through the polished surface due to the coated reflection occurring there.

Figure 7:
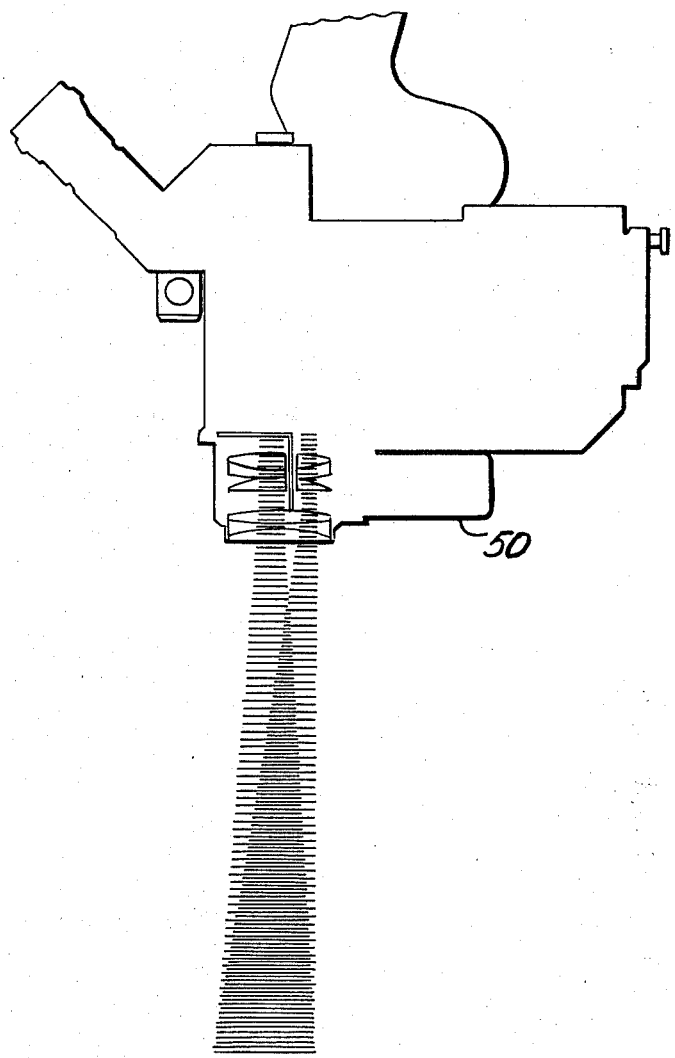
FIG. 7 is a drawing of an entire surgery microscope for which the present invention is suited.

FIG. 7 illustrates the entire surgery microscope 50 for which the present invention is applicable.

What is claimed is:

1. In a surgery microscope with a front lens having at least one displaceable element through which can be passed light beams in addition to observation beams, the improvement comprising that the displaceable element of the front lens is constructed in cut-through form between the path of the illumination rays and their reflections on the lens surfaces on the one hand and the path of the observation rays on the other and the cut point or notch is provided with a light barrier.

2. A surgery microscope according to claim 1, wherein the whole front lens is displaceable, wherein the cut extends substantially parallel to the optical axis and wherein the cutting notch is filled with said light barrier which is constructed as a cover plate whose length is at least equal to the sum of the thickness and of the displacement path of the displaceable front lens.

3. A surgery microscope according to claim 1, wherein the front lens in its entirety is displaceable and provided with a notch which is parallel to the optical axis and which is passed through all refracting surfaces of the front lens and in which a fixed cover plate, which serves as light barrier, separates the paths of the rays is arranged.

4. A surgery microscope according to claim 1, wherein the microscope includes a casing, and wherein the front lens includes a displaceable and a fixed element which is arranged on the object side, the movable element being separated by an axis parallel cut and the cover plate, serving as light barrier which projects through the cutting gap, is attached at the microscope casing and is guided parallel to the optical axis until just before the fixed element.

5. A surgery microscope according to claim 1, wherein the front lens also includes a fixed element, said displaceable and fixed elements arranged at the object side, the displaceable element being cut-through by a cut parallel to the optical axis and a cover plate which projects through the cutting gap being bent on the inside of the lens on the side of the path of observation rays and being attached at the microscope casing and, for passage of the path of observation rays, includes at least one opening.

6. A surgery microscope according to claim 1, wherein a light barrier is formed by coloring unpolished sectional planes black.

7. A surgery microscope according to claim 1, wherein a light barrier is formed by polishing the sectional planes of the displaceable element of the lens on the illumination side.

8. A surgery microscope according to claim 1, wherein the displaceable element of the front lens is constructed in completely cut-through form.

* * * * *